June 2, 1970     L. F. BLATT     3,514,829

ROLLERS

Filed June 27, 1968

INVENTOR
LELAND F. BLATT

BY Gullen, Sloman, & Cantor

ATTORNEYS

# United States Patent Office 3,514,829
Patented June 2, 1970

3,514,829
ROLLERS
Leland F. Blatt, 24121 Mound Road,
Grosse Pointe, Mich. 48091
Filed June 27, 1968, Ser. No. 740,698
Int. Cl. B21b *31/08*
U.S. Cl. 29—130                                    1 Claim

ABSTRACT OF THE DISCLOSURE

A variety of rollers particularly useful in automation, characterized by the use of a basic part or basic roller made up of an annulus or roller part of rubber-like material molded onto a tubular liner of metal; with a variety of mounting parts to enable the basic roller to be mounted interchangeably on a variety of shaft sizes and other locations; and with the roller part being of a variety of forms; thus providing a variety of completed rollers and mountings.

---

This application relates to rollers and aims to provide a variety of rollers and mountings therefor which may be interchangeably used as automation rollers.

THE DRAWINGS

For an understanding of the invention, reference should be had to the appended drawing.

In this drawing; which shows preferred embodiments:

DETAILED DESCRIPTION

Figure 1:
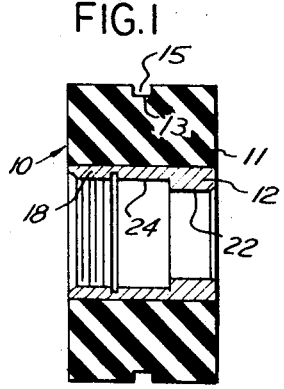
FIG. 1 is a sectional view of a basic roller.

FIG. 1 shows a basic roller 10 comprising a roller part 11 of a rubber-like material, such as neoprene, molded onto a tubular liner 12 of metal, and having an annular outside groove 13 for interlocking engagement with a rib 15 of a roller cover or tread 14 on its exterior surface. The metal liner 12 has one end portion 18 of larger internal diameter than the other end portion 22 and also has an intermediate internal diameter central portion 24.

MOUNTINGS

Figure 2:
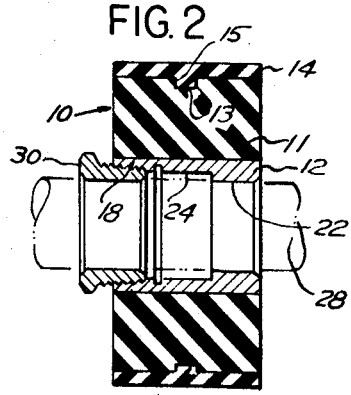
FIG. 2 is a similar view but showing mounting parts enabling the basic roller to be mounted on a large diameter shaft, and showing the basic roller equipped with an outside tire or tread.

FIG. 2 shows the basic roller of FIG. 1 provided with mounting details enabling it to be mounted on a large diameter shaft such as a shaft of one and one-quarter inches and referenced 28. In this case, the additional mounting detail comprises a split or resilient clamp nut 30 inside the larger diameter portion 18 of the liner 12 for filling the space between the liner and shaft 28 with the nut 30 being movable endwise axially into the larger diameter portion 18 of the liner.

Figure 3:
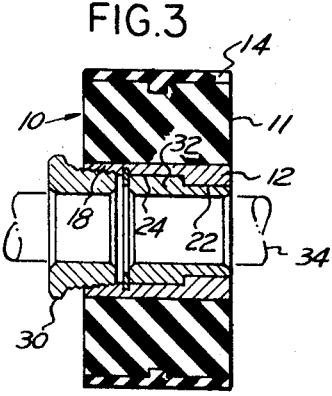
FIG. 3 is a similar view but showing mounting parts enabling the basic roller to be mounted on a smaller shaft.

FIG. 3 shows in addition an adapter 32 by which the parts of FIG. 2 may be mounted on a smaller diameter shaft 34 such as a shaft of one inch diameter. The adapter is a bushing and is located in the space between the smaller diameter portion 22 of the liner and the shaft and the adapter has an end portion of smaller external diameter than the other end portion and arranged with its smaller diameter portion inside the smaller diameter portion 22 of the liner and with its larger diameter portion inside the center portion 24 of the liner adjacent the clamp nut 30.

Figure 4:
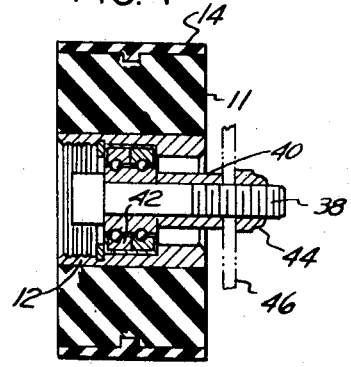
FIG. 4 is a similar view but showing mounting parts enabling the basic roller to be mounted on a cap screw and bearing and thus in turn to be mounted on a machine part.

FIG. 4 shows the basic roller mounted on a cap screw 38 equipped with a spacer 40 and a roller bearing 42 to provide a journalled mounting for the basic roller. As illustrated, the cap screw may be fastened by means of a lock nut 44 to any machine part as illustrated diagrammatically at 46.

It will be understood that in all cases suitable retainer rings may be used to hold into the liner the adapter 32, or the roller bearing 42 as necessary.

ROLLER 11

The roller part 11 may be of a variety of forms. FIG. 1 shows it as solid and as equipped with a roller cover 14, interlocked by rib 15 fitted into groove 13 of roller part 11.

Figure 5:
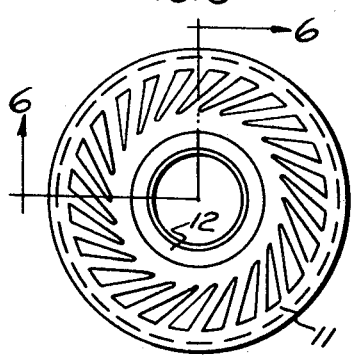
FIG. 5 is an end view of one form of basic roller differing slightly from the basic roller of FIGS. 1 to 4.
Figure 6:
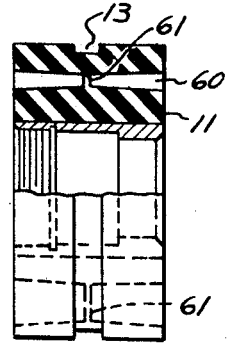
FIG. 6 is a section on line 6—6 of FIG. 5.

FIGS. 5–6 show roller part 11 as having numerous axial sockets 60 between its inner and outer cylindrical surfaces. The triangular cored sockets 60, distributed in the roll for flexing purposes, taper inwardly slightly, but do not touch, leaving a bulkhead 61 through the center of the roll to support the annular outside groove 13.

Figure 7:
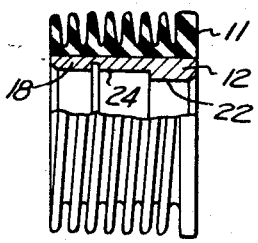
FIG. 7 is an elevation sectional view of a spirally grooved roller part.

FIG. 7 shows roller part 11 as being spirally grooved externally.

INTERCHANGEABILITY

A variety of basic roller parts 11 may be fabricated according to the style desired, as for example, the solid style of FIG. 1, the axially bored style of FIG. 5 or the spirally grooved style of FIG. 7; with or without, as desired, a roller cover 14; and with, if desired, a variety of formations for the spiral groove form of FIG. 7. Any roller may be selected from a group of rollers and interchangeably mounted in any one of several mounting situations, thus enabling great flexibility in the choice of roller as well as the choice of mountings. Any one of the rollers shown may be mounted by the use of a split nut 30 alone as in FIG. 2 on a large size shaft, or with an adapter as well as on a smaller size shaft as in FIG. 3, or on a roller bearing 42 and cap screw 38 as shown in FIG. 4.

From the foregoing, it will be seen that a wide variety and interchangeability of roller styles and roller mountings is provided but with there being a common basic roller as shown in FIG. 1 for all styles and mountings. Such basic roller includes the rubber-like annular roller part 11, solid as in FIG. 1, perforated as in FIG. 5, or spirally grooved as in FIG. 7; and in each and all cases molded onto a tubular linear of metal 12 as shown in FIG. 1, with such liner being of stepped internal form to receive a split nut alone as in FIG. 2 or a split nut and adapter as in FIG. 3, or a bearing and cap screw as in FIG. 4.

An important object of the present roller is to convey fragile parts effectively and without damage thereto due to the cushioning effect produced by the resilient roller employed and which is referred to as bonded to a liner. Such roller may be constructed of various types of elastomers such as rubber, neoprene or urethane, and is relatively soft in the area of 35 to 60 durometer. Thus the present roller incorporates molding the interior portion of the roll from a light or low durometer neoprene or equivalent to thus provide considerable cushioning effect which is further obtained through the use of spring action provided with the openings shown extending transversely through the body of the roll, FIG. 5.

As best shown in FIG. 2, there is an exterior annular groove upon such roll adapted to receive the annular key or flange which extends inwardly from the tire 14 which is molded of a much harder and tougher durometer material such as 60 durometer for illustration urethane or the equivalent to thus give the roll more life through the toughness of the material but at the same time allow flexing or cushioning effect due to the softer central body portion. Thus there is provided a roller which has tough exterior of urethane and an interior resilient body or soft center.

The roller construction shown in FIG. 4 employing the bolt 38 may be attached to a conveyor fragmentarily shown at 46.

In the illustration of FIG. 3, clamp nut 30 has a tapered thread to provide an effective means of clamping the roller upon the shaft 34, for illustration.

With respect to the roller body including the spiral exterior formation of FIG. 7, same may be used as a mechanical screw to crowd material moved thereover in the direction of the spiral either by gravity or through power application.

Now having described the roller construction herein disclosed, reference should be had to the claim which follows:

1. A roller comprising a solid annulus roller part of rubber-like material molded onto a tubular liner of metal; and wherein the liner has an internally threaded end portion of larger internal diameter than the other end portion and including in combination a split resilient externally threaded clamp nut threaded into the larger diameter portion of the liner and filling the space between the liner and a shaft on which the roller is mounted; with the nut being threaded endwise axially into such larger diameter portion of the liner, to clamp the liner and shaft to each other; and wherein the roller part has an external peripheral groove;

and including in combination a tread part in the form of a rubber like material sleeve having an internal rib which interlocks with the roller part for detachably interlocking the roller and tread parts.

References Cited

UNITED STATES PATENTS

| | | |
|---|---|---|
| 2,639,560 | 5/1953 | Cosmos. |
| 2,971,064 | 2/1961 | Leslie _____ 29—130 X |
| 3,212,168 | 10/1965 | Sommer _____ 29—116 |

FOREIGN PATENTS

| | | |
|---|---|---|
| 203,839 | 1/1955 | Australia. |

WALTER A. SCHEEL, Primary Examiner

L. G. MACHLIN, Assistant Examiner

U.S. Cl. X.R.

29—117, 132